US012048993B2

(12) United States Patent
Geiger et al.

(10) Patent No.: US 12,048,993 B2

(45) Date of Patent: Jul. 30, 2024

(54) HAND-HELD POWER TOOL

(71) Applicant: Hilti Aktiengesellschaft, Schaan (LI)

(72) Inventors: Steffen Geiger, Munich (DE); Andres Wellmann Jelic, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 270 days.

(21) Appl. No.: 17/628,040

(22) PCT Filed: Jul. 2, 2020

(86) PCT No.: PCT/EP2020/068597

§ 371 (c)(1),
(2) Date: Jan. 18, 2022

(87) PCT Pub. No.: WO2021/008877

PCT Pub. Date: Jan. 21, 2021

(65) Prior Publication Data

US 2022/0314412 A1 Oct. 6, 2022

(30) Foreign Application Priority Data

Jul. 18, 2019 (EP) .................................... 19186946

(51) Int. Cl.
*B25D 17/04* (2006.01)

(52) U.S. Cl.
CPC ...... *B25D 17/043* (2013.01); *B25D 2250/371* (2013.01)

(58) Field of Classification Search
CPC .................. B25D 17/043; B25D 17/24; B25D 2250/371; B25D 11/00; B25D 17/04; B25F 5/006; B25F 5/02; B23Q 11/0032
USPC .................................... 173/162.1, 162.2, 211
See application file for complete search history.

(56) References Cited

U.S. PATENT DOCUMENTS

| | | | | |
|---|---|---|---|---|
| 4,576,241 | A | 3/1986 | Emonet | |
| 7,137,542 | B2 | 11/2006 | Oki et al. | |
| 7,472,760 | B2 | 1/2009 | Stirm et al. | |
| 7,878,264 | B2 | 2/2011 | Koch et al. | |
| 8,272,453 | B2 | 9/2012 | Ullrich et al. | |
| 2004/0231867 | A1 | 11/2004 | Becht et al. | |
| 2006/0157263 | A1 * | 7/2006 | Malkin | B25D 17/043 173/207 |
| 2007/0144750 | A1 * | 6/2007 | Buchenau | B25G 1/01 173/162.1 |

(Continued)

FOREIGN PATENT DOCUMENTS

| | | | |
|---|---|---|---|
| CH | 195398 | A | 1/1938 |
| CN | 1593854 | A | 3/2005 |

(Continued)

OTHER PUBLICATIONS

PCT/EP2020/068597, International Search Report dated Oct. 1, 2020 (Two (2) pages).

*Primary Examiner* — Stephen F. Gerrity
*Assistant Examiner* — Linda J Hodge
(74) *Attorney, Agent, or Firm* — Crowell & Moring LLP

(57) ABSTRACT

A hand-held power tool includes a handle which is grippable by a user, a tool body, a pivot pin, where the handle is pivotably mounted on the tool body by the pivot pin, and a tension spring, where the handle is hooked on the tool body by the tension spring and the handle is decoupled from vibrations acting on the tool body by the tension spring.

8 Claims, 1 Drawing Sheet

(56) References Cited

U.S. PATENT DOCUMENTS

| | | | |
|---|---|---|---|
| 2009/0025950 | A1 | 1/2009 | Steinke et al. |
| 2009/0032276 | A1 | 2/2009 | Koch et al. |

FOREIGN PATENT DOCUMENTS

| | | | | | |
|---|---|---|---|---|---|
| CN | 101945738 | A | | 1/2011 | |
| CN | 201711953 | U | | 1/2011 | |
| CN | 203125480 | U | | 8/2013 | |
| CN | 204976564 | U | | 1/2016 | |
| DE | 4104917 | | * | 8/1992 | ........... B25D 17/043 |
| EP | 0 033 304 | A1 | | 8/1981 | |
| EP | 391856 | | * | 10/1990 | ........... B25D 17/043 |
| EP | 2 018 937 | A2 | | 1/2009 | |
| EP | 4124413 | | * | 2/2023 | ................ B25F 5/00 |
| JP | 56-107890 | A | | 8/1981 | |
| JP | 2005-138282 | A | | 6/2005 | |

* cited by examiner

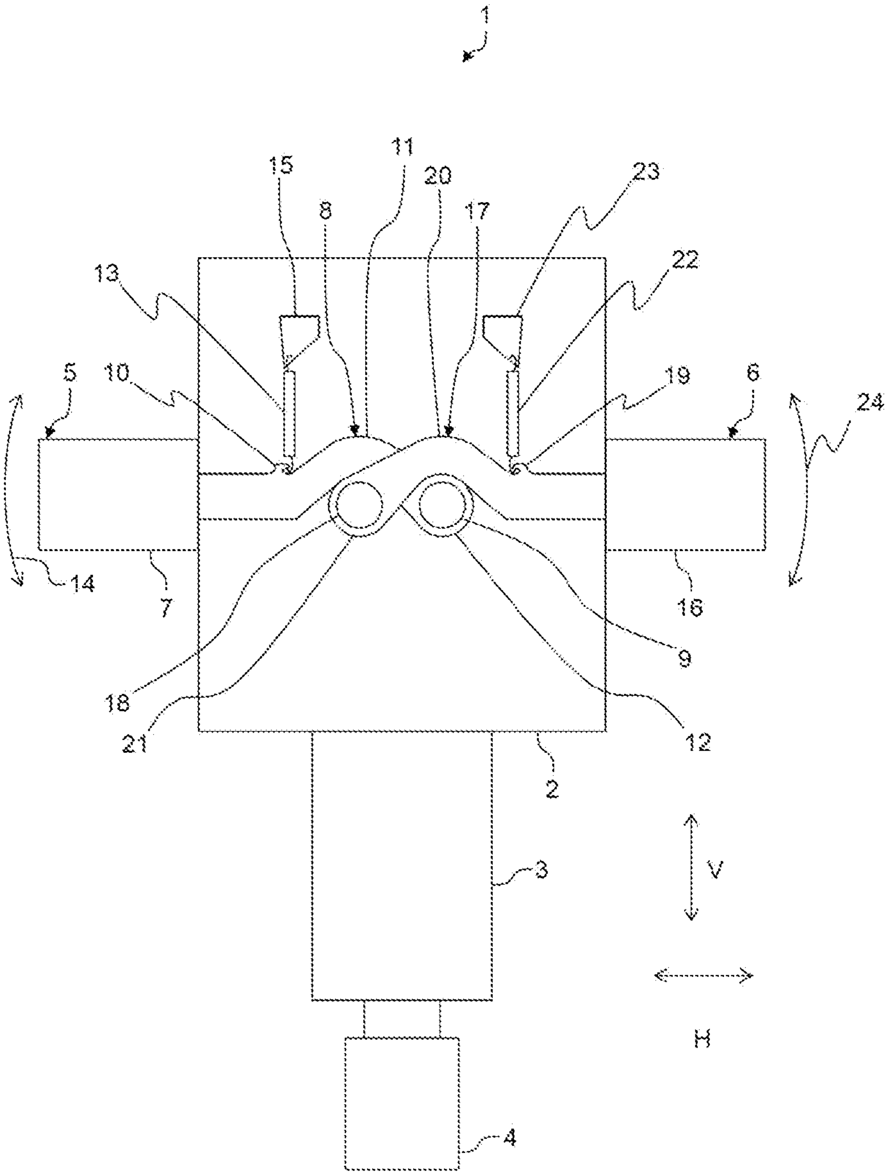
1
15
11
8
20
17
23
13
22
5
10
19
6
24
14
7
16
9
18
21
12
2
3
V
H
4

HAND-HELD POWER TOOL

BACKGROUND AND SUMMARY OF THE INVENTION

The present invention relates to a hand-held power tool, in particular a demolition hammer or a chisel hammer.

A demolition hammer or a chisel hammer has a tool body, a striking mechanism and a tool fitting, in which a tool, such as for example a chisel, can be fitted. For operating the demolition hammer, handles are provided on both sides of the tool body, are mounted on the tool body by pivot bearings for vibration decoupling and are each provided with a compression spring for decoupling the vibrations applied to the tool body by the tool or the striking mechanism. Such a compression spring may however have the tendency to buckle under compressive loading, whereby the compression spring may come to bear against a spring guide assigned to the compression spring. The friction thereby occurring may impair the vibration decoupling.

An object of the present invention is to provide an improved hand-held power tool.

Accordingly, a hand-held power tool, in particular a demolition hammer or a chisel hammer, is proposed. The hand-held power tool comprises a handle, which can be gripped by a user, a tool body, a pivot pin, by means of which the handle is pivotably mounted on the tool body, and a tension spring, by means of which the handle is hooked on the tool body in such a way that the handle is decoupled from vibrations acting on the tool body.

Using a tension spring instead of a compression spring has the effect that buckling of the spring under loading can be reliably prevented. The occurrence of friction between the tension spring and a spring guide is avoided. As a result, reliable decoupling of the handle from oscillations or vibrations is always ensured.

That the handle is "decoupled" from vibrations acting on the tool body should be understood as meaning that the vibrations are not transmitted from the tool body to the handle, or are at least transmitted to a reduced extent. In particular, the oscillation amplitude of the vibrations or oscillations can be reduced. The hand-held power tool may comprise in addition to the tool body a striking mechanism, which may be arranged within the tool body, and a tool fitting, for example a chuck, for fitting a tool. Preferably, the tension spring is always under tensile stress during the operation of the hand-held power tool. The tension spring is preferably a cylindrical spring. However, the tension spring may also be an elastomer body, for example an elastomer strap.

According to one embodiment, the hand-held power tool comprises a first handle, to which a first pivot pin and a first tension spring are assigned, and a second handle, to which a second pivot pin and a second tension spring are assigned.

Preferably, the first pivot pin and the second pivot pin are arranged at the same height with respect to a vertical direction. With respect to a horizontal direction, the first pivot pin and the second pivot pin are preferably spaced apart from one another and positioned next to one another.

According to a further embodiment, the first handle has a first gripping element, which can be gripped by the user, and the second handle has a second gripping element, which can likewise be gripped by the user, the second pivot pin being arranged between the first pivot pin and the first gripping element and the first pivot pin being arranged between the second pivot pin and the second gripping element.

The gripping elements are preferably formed at least in certain portions from an elastically deformable material, such as for example a thermoplastic elastomer, rubber, cork or the like. This increases the operating comfort.

According to a further embodiment, the first handle has a first base element, which is pivotably mounted on the tool body by means of the first pivot pin, and the second handle has a second base element, which is pivotably mounted on the tool body by means of the second pivot pin, the first base element being led around the second pivot pin, and the second base element being led around the first pivot pin.

Preferably, the first gripping element is fixedly connected to the first base element and the second gripping element is fixedly connected to the second base element. The base elements each have an arcuately curved arc portion, which is led around the corresponding pivot pin. The fact that the respective base element is led around the respective pivot pin of the other handle means that the base elements can be made as long as possible, while maintaining a compact construction of the hand-held power tool. As a result, a spring deflection of the respective tension spring that is as great as possible can be achieved. This improves the vibration decoupling.

According to a further embodiment, the first base element has a first fastening point, at which the first tension spring is fastened, and the second base element has a second fastening point, at which the second tension spring is fastened, the first fastening point being arranged between the first gripping element and the first pivot pin, and the second fastening point being arranged between the second gripping element and the second pivot pin.

Preferably, the tension springs are each hooked into the fastening points. This allows easy mounting of the tension springs.

According to a further embodiment, the first fastening point is arranged closer to the second pivot pin than to the first pivot pin, and the second fastening point is arranged closer to the first pivot pin than to the second pivot pin.

As a result, the distance from the first pivot pin to the first fastening point and the distance from the second pivot pin to the second fastening point are as long as possible, which allows a spring deflection of the respective tension spring that is as great as possible. As previously mentioned, this improves the vibration decoupling.

According to a further embodiment, the first fastening point is formed as a hook, into which the first tension spring is hooked, and the second fastening point is formed as a hook, into which the second tension spring is hooked.

This allows the tension springs to be easily exchanged. This makes maintenance of the hand-held power tool easier.

According to a further embodiment, the tension spring is hooked into the tool body.

In particular, the first tension spring is hooked into the tool body, and also the second tension spring is hooked into the tool body.

According to a further embodiment, the hand-held power tool comprises a hooking element, which is connected to the tool body and into which the tension spring is hooked.

Preferably, a first hooking element, into which the first tension spring is hooked, and a second hooking element, into which the second tension spring is hooked, are provided. The hooking elements may be in the form of plates. For example, the hooking elements are screwed to the tool body or hooked into it. The hooking elements each have a hook, into which the corresponding tension spring can be easily hooked. This makes the assembly of the hand-held power tool easier.

According to a further embodiment, the first handle and the second handle are arranged on sides of the tool body lying opposite one another.

The handles can each be swiveled clockwise and counterclockwise about the corresponding pivot pin.

The following description explains the invention on the basis of exemplary embodiments and a FIGURE.

BRIEF DESCRIPTION OF THE DRAWING

The single FIGURE shows a schematic view of an embodiment of a hand-held power tool.

DETAILED DESCRIPTION OF THE DRAWING

Unless otherwise stated, elements that are the same or functionally the same are indicated in the FIGURE by the same reference signs.

The FIGURE shows a schematic view of an embodiment of a hand-held power tool 1. The hand-held power tool 1 is in particular a demolition hammer or a chisel hammer. The hand-held power tool 1 comprises a tool body 2. The tool body 2 may comprise a housing, in which a drive system of the hand-held power tool 1 is fitted. The drive system may for example comprise an electric motor.

In the orientation of the FIGURE, a striking mechanism 3 is provided on the underside of the tool body 2. A tool fitting 4 is provided on the front side of the striking mechanism 3. The tool fitting 4 is suitable for fitting a tool, such as for example a chisel. The tool fitting 4 may be a chuck. During the operation of the hand-held power tool 1, the tool fitting 4 is driven by the striking mechanism 3, so that the tool moves up and down along a vertical direction V. The hand-held power tool 1 is also assigned a horizontal direction H. The horizontal direction H is oriented perpendicularly to the vertical direction V. The vertical direction V may coincide with the direction of gravitational force.

The hand-held power tool 1 comprises a first handle 5 and also a second handle 6. The handles 5, 6 can each be gripped by the hand of a user. The handles 5, 6 are decoupled from the tool body 2. That is to say that vibrations or oscillations acting on the tool body 2 during the operation of the hand-held power tool 1 are not transmitted to the handles 5, 6, or are only transmitted to a restricted extent. The handles 5, 6 are arranged on sides of the tool body 2 lying opposite one another.

The first handle 5 comprises a first gripping element 7, which can be gripped by the user. The first gripping element 7 is arranged completely outside the tool body 2. The first gripping element 7 may be produced at least in certain portions from an elastically deformable material, such as for example a thermoplastic elastomer, rubber, cork or the like. The first handle 5 is also assigned a first base element 8. The first gripping element 7 is fixedly connected to the first base element 8.

The first base element 8 is pivotably mounted on the tool body 2 by means of a first pivot pin 9. The first pivot pin 9 may be for example a bolt which is fixed in relation to the tool body 2 and on which the first base element 8 is pivotably mounted. Alternatively, the first pivot pin 9 may also be a bolt which is fixedly connected to the first base element 8 and is pivotably mounted on the tool body 2.

The first base element 8 comprises a fastening point 10, which may be formed as a hook. Furthermore, the first base element 8 comprises an arcuately curved arc portion 11 and also a bearing portion 12, which is provided at the end of the arc portion 11. The first pivot pin 9 is fitted in the bearing portion 12.

The first handle 5 is also assigned a first tension spring 13. By means of the first tension spring 13, the first handle 5 is hooked on the tool body 2 in such a way that the first handle 5 is decoupled from vibrations acting on the tool body 2. In this case, the first tension spring 13 is always under tensile stress. The mobility of the first handle 5 is indicated by means of a double-headed arrow 14. The first tension spring 13 is preferably a cylindrical spring or a helical tension spring. The first tension spring 13 may however also be an elastomer body, for example an elastomer strap.

The first tension spring 13 is assigned a first hooking element 15 in the form of a plate, which in turn is fixedly connected to the tool body 2. The first hooking element 15 is optional. That is to say that the first tension spring 13 may also be hooked directly into the tool body 2.

The second handle 6 is constructed in a way analogous to the first handle 5 and comprises a second gripping element 16, which is fastened to a second base element 17. The second base element 17, like the first base element 8, is pivotably mounted on the tool body 2 by means of a second pivot pin 18. The second base element 17 comprises a fastening point 19, which is formed as a hook, an arcuately curved arc portion 20, which is led around the first pivot pin 9, and also a fastening portion 21, in which the second pivot pin 18 is fitted. Furthermore, the second handle 6 is assigned a second tension spring 22, which is hooked into the second base element 17 at the fastening point 19. The second tension spring 22 is preferably a cylindrical spring or a helical tension spring. The second tension spring 22 may however also be an elastomer body, for example an elastomer strap. The second tension spring 22 is in turn connected to the base body 2 by means of an optional second hooking element 23. The mobility of the second handle 6 is indicated by means of a double-headed arrow 24.

As the FIGURE also shows, the arc portion 20 of the second base element 17 is led around the first pivot pin 9, and the arc portion 11 of the first base element 8 is led around the second pivot pin 18. The pivot pins 9, 18 are in this case positioned at the same height with respect to the vertical direction V and are spaced apart from one another and next to one another with respect to the horizontal direction H. The fastening point 10 is in this case positioned closer to the second pivot pin 18 than to the first pivot pin 9. Accordingly, the fastening point 19 is also positioned closer to the first pivot pin 9 than to the second pivot pin 18. Furthermore, the fastening point 10 is positioned between the first gripping element 7 and the first pivot pin 9, and the fastening point 19 is positioned between the second gripping element 16 and the second pivot pin 18.

The functionality of the hand-held power tool 1 is explained below. During the operation of the hand-held power tool 1, vibrations are transmitted to the tool body 2 from the tool clamped in the tool fitting 4. The handles 5, 6 are decoupled from the tool body 2 by means of the tension springs 13, 22 in such a way that the vibrations transmitted to the tool body 2 are not transmitted to the handles 5, 6, or are at least transmitted to a reduced extent. The handles 5, 6 can in this case be swiveled clockwise and counterclockwise about the pivot pins 9, 18, as indicated by means of the double-headed arrows 14, 24.

In this case, however, the tension springs 13, 22 always remain under tensile stress. As a result, it is reliably prevented that the tension springs 13, 22 can buckle under loading, in comparison with a hand-held power tool with compression springs for vibration damping. When such compression springs buckle, they may come into frictional contact with a spring guide. This is reliably prevented by the use of the tension springs 13, 22. As a result, a friction-induced impairment of the vibration decoupling of the handles 5, 6 is reliably prevented.

LIST OF REFERENCE CHARACTERS

1 Hand-held power tool
2 Tool body
3 Striking mechanism
4 Tool fitting
5 Handle
6 Handle
7 Gripping element
8 Base element
9 Pivot pin
10 Fastening point
11 Arc portion
12 Bearing portion
13 Tension spring
14 Double-headed arrow
15 Hooking element
16 Gripping element
17 Base element
18 Pivot pin
19 Fastening point
20 Arc portion
21 Fastening portion
22 Tension spring
23 Hooking element
24 Double-headed arrow
H Horizontal direction
V Vertical direction

The invention claimed is:

1. A hand-held power tool, comprising:

a first handle which is grippable by a user;

a tool body;

a first pivot pin, wherein the first handle is pivotably mounted on the tool body by the first pivot pin;

a first tension spring, wherein the first handle is hooked on the tool body by the first tension spring and wherein the first handle is decoupled from vibrations acting on the tool body by the first tension spring;

a second handle;

a second pivot pin, wherein the second handle is pivotably mounted on the tool body by the second pivot pin; and a second tension spring, wherein the second handle is hooked on the tool body by the second tension spring and wherein the second handle is decoupled from vibrations acting on the tool body by the second tension spring;

wherein the first handle has a first gripping element which is grippable by the user, wherein the second handle has a second gripping element which is grippable by the user, wherein the second pivot pin is disposed between the first pivot pin and the first gripping element, and wherein the first pivot pin is disposed between the second pivot pin and the second gripping element;

wherein the first handle has a first base element which is pivotably mounted on the tool body by the first pivot pin and wherein the second handle has a second base element which is pivotably mounted on the tool body by the second pivot pin;

wherein the first base element has a first arcuately curved arc portion which is led around the second pivot pin and wherein the second base element has a second arcuately curved arc portion which is led around the first pivot pin;

wherein the first pivot pin and the second pivot pin are disposed next to one another and are both disposed between the first tension spring and the second tension spring.

2. The hand-held power tool as claimed in claim 1, wherein the hand-held power tool is a demolition hammer or a chisel hammer.

3. The hand-held power tool as claimed in claim 1, wherein the first base element has a first fastening point at which the first tension spring is fastened, wherein the second base element has a second fastening point at which the second tension spring is fastened, wherein the first fastening point is disposed between the first gripping element and the first pivot pin, and wherein the second fastening point is disposed between the second gripping element and the second pivot pin.

4. The hand-held power tool as claimed in claim 3, wherein the first fastening point is disposed closer to the second pivot pin than to the first pivot pin and wherein the second fastening point is disposed closer to the first pivot pin than to the second pivot pin.

5. The hand-held power tool as claimed in claim 3, wherein the first fastening point is formed as a first hook into which the first tension spring is hooked and wherein the second fastening point is formed as a second hook into which the second tension spring is hooked.

6. The hand-held power tool as claimed in claim 1, wherein the first tension spring is hooked into the tool body.

7. The hand-held power tool as claimed in claim 6, further comprising a hooking element which is connected to the tool body and into which the first tension spring is hooked.

8. The hand-held power tool as claimed in claim 1, wherein the first handle and the second handle are disposed on respective sides of the tool body which lie opposite one another.

* * * * *